(12) United States Patent
Chen et al.

(10) Patent No.: US 8,983,168 B2
(45) Date of Patent: Mar. 17, 2015

(54) SYSTEM AND METHOD OF CATEGORISING DEFECTS IN A MEDIA ITEM

(75) Inventors: Ping Chen, Beijing (CN); Chao He, Causeway Bay (HK); Gary Ross, Edinburgh (GB)

(73) Assignee: NCR Corporation, Duluth, GA (US)

( * ) Notice: Subject to any disclaimer, the term of this patent is extended or adjusted under 35 U.S.C. 154(b) by 19 days.

(21) Appl. No.: 13/460,172

(22) Filed: Apr. 30, 2012

(65) Prior Publication Data

US 2013/0287264 A1 Oct. 31, 2013

(51) Int. Cl.
*G06K 9/00* (2006.01)

(52) U.S. Cl.
USPC ........................................................ 382/135

(58) Field of Classification Search
USPC ........................................................ 382/135
See application file for complete search history.

(56) References Cited

U.S. PATENT DOCUMENTS

| | | | |
|---|---|---|---|
| 5,544,256 A | 8/1996 | Brecher et al. | |
| 6,233,364 B1 | 5/2001 | Krainiouk et al. | |
| 7,978,899 B2* | 7/2011 | Jenrick et al. | 382/135 |
| 8,417,016 B2* | 4/2013 | Bell et al. | 382/135 |
| 8,499,918 B2* | 8/2013 | Nireki | 194/207 |
| 8,559,694 B2* | 10/2013 | Jenrick et al. | 382/135 |
| 2005/0029168 A1* | 2/2005 | Jones et al. | 209/534 |
| 2005/0075801 A1* | 4/2005 | Skeps et al. | 702/35 |
| 2010/0074516 A1 | 3/2010 | Kawaragi | |
| 2011/0224918 A1* | 9/2011 | Floeder et al. | 702/35 |
| 2012/0120455 A1* | 5/2012 | Schroeder et al. | 358/448 |

FOREIGN PATENT DOCUMENTS

EP 0859343 A2 8/1998

OTHER PUBLICATIONS

A. Rashid, A. Prati, R. Cucchiara, A Real-Time Embedded Solution for Skew Correction in Banknote Analysis in Proceedings of IEEE International Workshop on Embebbed Computer Vision, Colorado Springs, CO (USA), pp. 1-8, Jun. 20, 2011, 2011.*
S. A. Hojjatoleslami and J. Kittler, Region Growing: A New Approach, IEEE Transactions on Image Processing, vol. 7, No. 7, Jul. 1998, pp. 1079-1084.*
Search Report for European Application No. 12180365.4-1954 dated May 13, 2013.
Adnan Rashid et al. "A Real-Time Embedded Solution for Skew Correction in Banknote Analysis." Computer Vision and Pattern Recognition Workshops (CVPRW), 2011 IEEE Computer Society Conference, IEEE (ISBN 978-1-4577-0529-8). Jun. 20, 2011, pp. 42-49.
IEEE Region Growing: A New Approach S. A. Hojjatoleslami and J. Kittler Transactions on Image Processing, vol. 7, No. 7, Jul. 1998 p. 1079-1084).
(http://homepages.inf.ed.ac.uk/rbf/BOOKS/BANDB/bandb.htm), Section 5 Algorithm 5.3 (Refer to p. 9 in attached "Ballard and Brown's Computer Vision—Section 5.pdf"), 1982.

* cited by examiner

*Primary Examiner* — Wesley Tucker
(74) *Attorney, Agent, or Firm* — Joseph P. Mehrle (57) ABSTRACT

A method of categorizing defects in a media item. The method comprising the steps of: receiving a binarised image of the media item, where the binarised image comprises a plurality of pixels, each pixel having either a potential defect intensity or a non-defect intensity; and identifying one or more blobs comprising contiguous pixels each having a potential defect intensity. For each identified blob, the method involves comparing a size of the blob with a damage threshold; ignoring the blob if the blob size is smaller than the damage threshold; and for each identified blob having a size exceeding or equaling the damage threshold, categorizing the identified blob.

12 Claims, 6 Drawing Sheets

SYSTEM AND METHOD OF CATEGORISING DEFECTS IN A MEDIA ITEM

FIELD OF INVENTION

The present invention relates to defect categorisation. In particular, though not exclusively, the invention relates to automated defect categorisation in media items, such as those deposited in self-service terminals (SSTs). The invention also relates to media item assessment based on categorised defects.

BACKGROUND OF INVENTION

Some SSTs, such as automated teller machines (ATMs), can receive media items in the form of banknotes (or cheques) deposited by a customer.

Some currency issuing authorities (such as the European Central Bank) have mandated that banks should capture and return to that authority any currency that is deemed unfit for continued circulation. This is relatively easy to implement when currency is handed to a bank teller because the teller can physically inspect the banknotes, but is more difficult to implement when banknotes are deposited in ATMs because no human teller is involved.

SUMMARY OF INVENTION

Accordingly, the invention generally provides methods, systems, apparatus, and software for automatically categorising defects in media items.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of categorising defects in a media item, the method comprising the steps of:

receiving a binarised image of the media item, where the binarised image comprises a plurality of pixels, each pixel having either a potential defect intensity or a non-defect intensity;

identifying one or more blobs comprising contiguous pixels each having a potential defect intensity;

for each identified blob, comparing a size of the blob with a damage threshold;

ignoring the blob if the blob size is smaller than the damage threshold; and for each identified blob having a size exceeding or equal to the damage threshold, categorising the identified blob.

As used herein, a "blob" comprises contiguous pixels in an image that all have a similar property (for example, intensity) that is different to the corresponding property (in this example, intensity) of the surrounding pixels.

The two intensity values may represent high intensity and low intensity respectively. The potential defect intensity may comprise a high intensity if transmission was used to create the image; alternatively, the potential defect intensity may comprise a low intensity if reflectance was used to create the image.

The step of identifying one or more blobs may comprise using a region growing algorithm (one example of this is described in *IEEE Region Growing: A New Approach* S. A. Holiatoleslami and J. Kittler *TRANSACTIONS ON IMAGE PROCESSING*, VOL. 7, NO. 7, JULY 1998 page 1079-1084), a split and merge algorithm (one example of this is described in S. L. Horowitz and T. Pavlidis, *Picture Segmentation by a Directed Split and Merge Procedure, Proc. ICPR,* 1974, Denmark, pp. 424-433) or any other convenient algorithm. These two algorithms are computationally intensive.

Advantageously, the step of identifying one or more blobs may comprise a modified union-find structure algorithm.

The modified union-find structure algorithm may comprise: identifying on each row of the binarised image, each group of pixels that are contiguous and that have a potential defect intensity; identifying for each row boundary, (i) each group in an upper row that at least partially overlaps with a group on the lower row, and merging these two groups into a new single group as a growing blob, (ii) each group in an upper row that does not overlap a group on the lower row, and characterising each such group in the upper row as a complete blob, and (iii) each group in the lower row that does not overlap a group on the upper row, and characterising each such group as a growing blob. When the modified union-find structure algorithm is complete, then one or more complete blobs may be presented. Preferably, for each complete blob, the blob location, size and dimensions are stored.

The step of categorising the identified blob may include the categories of: tear, missing portion (including missing corner), corner fold, and hole.

The step of categorising the identified blob may comprise the further step of: (a) categorising the identified blob as a hole if the blob does not touch one of the edges of the media item. If an identified blob has no connection to an edge of the media item, it may be categorised as a hole.

The step of categorising the identified blob may comprise the further step of: (b) if the identified blob does touch one of the edges of the media item but is not at one of the corners of the media item, then categorising the identified blob as a tear/missing portion. Whether the identified blob is a tear or a missing portion depends on the size of the identified blob, so the step of categorising the identified blob may comprise the further step of comparing the size of the identified blob with a maximum tear size to categorise the identified blob as a tear or as a missing portion.

The step of categorising the identified blob may comprise the further step of: (c) if the identified blob does touch one of the corners of the media item then ascertaining if the identified blob is a corner fold.

The step of ascertaining if the identified blob is a corner fold may include comparing pixel intensities from a potential corner overlap region with pixel intensities from a neighbouring non-overlap region.

The step of categorising the identified blob may comprise the further step of: (d) if the identified blob does touch one of the corners of the media item but is not a corner fold, then categorising the identified blob as a missing portion, or more precisely a missing corner if required.

The step of categorising the identified blob may comprise the further step of: (e) if the identified blob does touch one of the corners of the media item and is a corner fold, then categorising the identified blob as a corner fold.

The method may comprise the additional step of applying fitness rules to the categorised blobs to ascertain if the media item should be classified as unfit.

The fitness rules may comprise a different set of rules for each category of defect. For example, a media item may be rejected as unfit if it has a hole larger than or equal to ten millimeter square (10 mm$^2$); or if a corner fold has a shorter edge longer than or equal to ten millimeter (10 mm) and its area is larger than or equal to 130 mm$^2$.

The method may comprise the additional steps of capturing an image of the media item and then creating a binary image from the captured image prior to the step of receiving a binarised image of the media item.

The step of capturing an image of the media item may further comprise capturing a transmission image of the media item. A transmission image may be captured using an electro-magnetic radiation transmitter on one side of the media item and an electro-magnetic radiation detector on the opposite side of the media item. In one embodiment, the electro-magnetic radiation used is infra-red radiation.

The step of capturing an image of the media item may include using eight bits to record the intensity value for each pixel (giving a range of intensity values from 0 to 255). Alternatively, any convenient number of bits may be used, such as 16 bits, which would provide a range of intensity values between 0 and 65535).

The method may comprise the additional step of adjusting spatial dimensions of the received image so that the received image matches spatial dimensions of a reference for that media item. This compensates for any media items that have added portions (such as adhesive tape) or have shrunk or expanded, or the like. Techniques for automatically aligning a captured image with a reference image, and then cropping or adding to the captured image to match the spatial dimensions of the reference image are well known in the art.

According to a second aspect there is provided a media validator operable to categorise defects on a media item presented thereto, the media validator comprising:

a media item transport for transporting a media item;

an image capture device aligned with the media item transport and for capturing a two-dimensional array of pixels corresponding to the media item, each pixel having a pixel intensity relating to a property of the media item at a spatial location on the media item corresponding to that pixel; and a processor programmed to control the media transport and the image capture device, and also programmed to: (a) identify one or more blobs comprising contiguous pixels each having a potential defect intensity; (b) for each identified blob, compare a size of the blob with a damage threshold; (c) ignore the blob if the blob size is smaller than the damage threshold; and (d) for each identified blob having a size not smaller than the damage threshold, categorise the identified blob.

The processor may further implement the additional steps recited with respect to the first aspect.

The media item transport may comprise one or more endless belts, skid plates, rollers, or the like.

The image capture device may comprise a two dimensional sensor, such as a CCD contact image sensor (CIS), that has a sensor area at least as large as the media item area. This enables an entire two-dimensional image to be captured at one point in time. Alternatively, the image capture device may comprise a linear sensor (covering one dimension of the media item, but not both dimensions) that captures a strip of the media item as the media item passes the linear sensor, so that once the entire media item has passed the linear sensor then a complete two-dimensional image of the media item can be constructed from the sequence of images captured by the linear sensor. This would enable a lower cost sensor to be used because a smaller sensing area (only as large as one dimension of the media item) would be sufficient.

The image capture device may further comprise an illumination source. The illumination source may comprise an infra-red radiation source.

The image capture device may be located on the opposite side of the media item (the opposite side of the media item path when no media item is present) to the illumination source so that a transmission image is captured. Alternatively, but less advantageously, the image capture device may be located on the same side of the media item as the illumination source so that a reflectance image is captured.

The media validator may comprise a banknote validator. The banknote validator may be incorporated into a media depository, which may be incorporated into a self-service terminal, such as an ATM.

According to a third aspect there is provided a computer program programmed to implement the steps of the first aspect. The computer program may be executed by a media validator.

According to a fourth aspect there is provided a defect profile configuration file, the file comprising: a defect type parameter; a defect size field; and a logic parameter.

The defect type may comprise an absence-type of defect in a media item. An absence-type of defect is where there is no substrate at a portion of the media item where there should be a substrate.

The defect configuration file may comprise a plurality of defect size parameters within the defect size field.

Each defect size parameter may comprise: a defect length parameter, a defect width parameter, or a defect area parameter.

The logic parameter may be used to indicate how the defect size parameters are associated. For example, if a defect type parameter is a "Missing Portion", and if a defect length is 6 mm and a defect width is 5 mm, and the logic parameter is "OR", then a media item will be identified as unfit if it has an identified blob categorised as a missing portion having either a width exceeding or equal to 5 mm or a length exceeding or equal to 6 mm.

According to a fifth aspect there is provided a method of characterising a media item as unfit, the method comprising:

implementing the method of the first aspect to categorise defects in the media item;

for each categorised defect, accessing a defect profile configuration file to retrieve (i) a defect type matching the categorised defect, and (ii) a defect size associated with that defect type; and characterising the media item as unfit if a categorised defect includes a dimension greater than or equal to a defect size for that defect type.

According to a sixth aspect there is provided a media validator programmed to implement the fifth aspect.

The media validator preferably implements additional media item processing functions, such as media item recognition, validation, stain detection, wear detection, extraneous matter detection, and the like.

The media item may comprise a banknote.

For clarity and simplicity of description, not all combinations of elements provided in the aspects recited above have been set forth expressly. Notwithstanding this, the skilled person will directly and unambiguously recognise that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
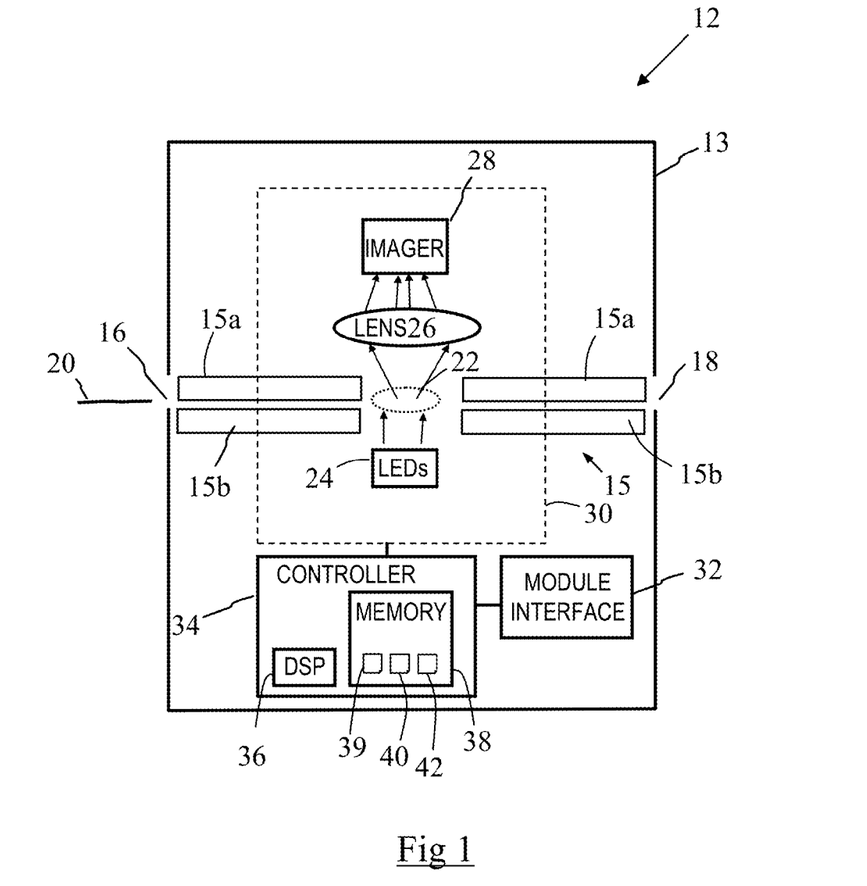
FIG. 1 is a schematic diagram of a defect categorisation system comprising a media validator for implementing a method of categorising defects on a media item inserted therein according to one embodiment of the present invention.

Reference is first made to FIG. 1, which is a simplified schematic diagram of a defect categorisation system comprising a media item validator 12 (in the form of a banknote validator) for implementing a method of categorising defects on a media item (and also for assessing the fitness of the media item) according to one embodiment of the present invention.

The banknote validator 12 comprises a housing 13 supporting a transport mechanism 15 in the form a train of pinch rollers comprising upper pinch rollers 15a aligned with lower pinch rollers 15b, extending from an entrance port 16 to a capture port 18.

The entrance and capture ports 16,18 are in the form of apertures defined by the housing 13. In use, the capture port 18 would typically be aligned with parts of a depository module.

In use, the pinch rollers 15a,b guide a media item (in this embodiment a banknote) 20 short edge first through an examination area 22 defined by a gap between adjacent pinch roller pairs. While the banknote 20 is being conveyed through the examination area 22, the banknote 20 is illuminated selectively by illumination sources, including a lower linear array of infra-red LEDs 24 arranged to illuminate across the short edge of the banknote 20. The infra-red LEDs 24 are used for transmission measurements. Additional illumination sources are provided for other functions of the banknote validator 12 (for example, banknote identification, counterfeit detection, and the like), but these are not relevant to this invention, so will not be described herein.

When the infra-red LEDs 24 are illuminated, the emitted infra-red radiation is incident on an underside of the banknote 20, and an optical lens 26 focuses light transmitted through the banknote 20 to the optical imager 28 (in this embodiment a CCD contact image sensor (CIS)). This provides a transmitted infra-red channel output from the optical imager 28. In this embodiment, the optical imager 28 comprises an array of elements, each element providing an eight bit value of detected intensity. The CIS 28 in this embodiment is a 200 dots per inch sensor but the outputs are averaged, in this embodiment, so that 25 dots per inch are provided.

The illumination source 24, lens 26, and imager 28 comprise an image collection component 30.

The banknote validator 12 includes a data and power interface 32 for allowing the banknote validator 12 to transfer data to an external unit, such as an ATM (not shown) a media depository (not shown), or a PC (not shown), and to receive data, commands, and power therefrom. The banknote validator 12 would typically be incorporated into a media depository, which would typically be incorporated into an ATM.

The banknote validator 12 also has a controller 34 including a digital signal processor (DSP) 36 and an associated memory 38. The controller 34 controls the pinch rollers 15 and the image collection component 30 (including energising and de-energising the illuminating source 24). The controller 34 also collates and processes data captured by the image collection component 30, and communicates this data and/or results of any analysis of this data to the external unit via the data and power interface 32. The controller 34 receives the infra-red transmission data from the optical imager 28.

Figure 2A:
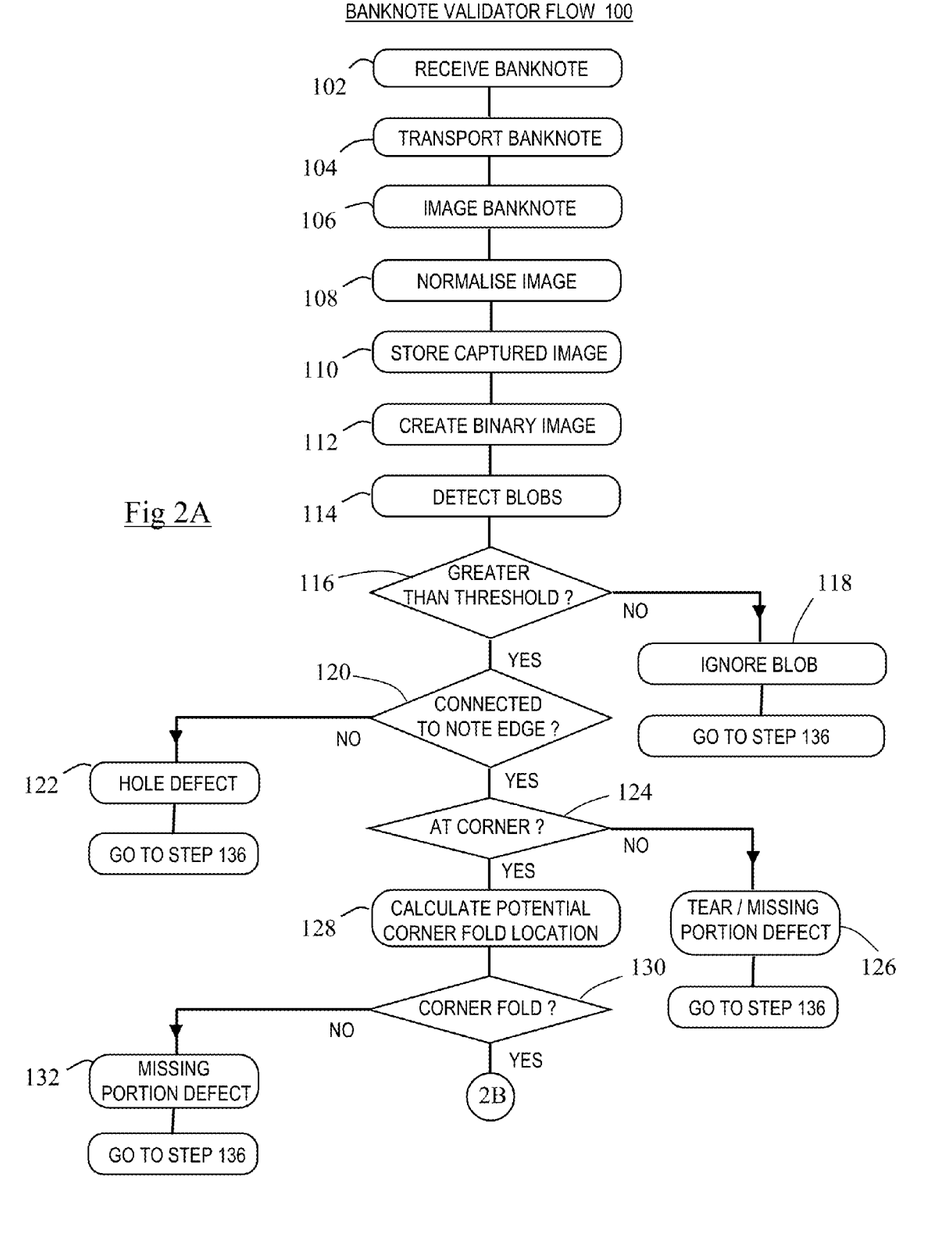
FIG. 2 (split over two sheets in the drawings) is a flowchart illustrating steps performed by the media validator of FIG. 1 in capturing and processing an image of a media item as part of defect categorisation and media item fitness assessment.
Figure 2B:
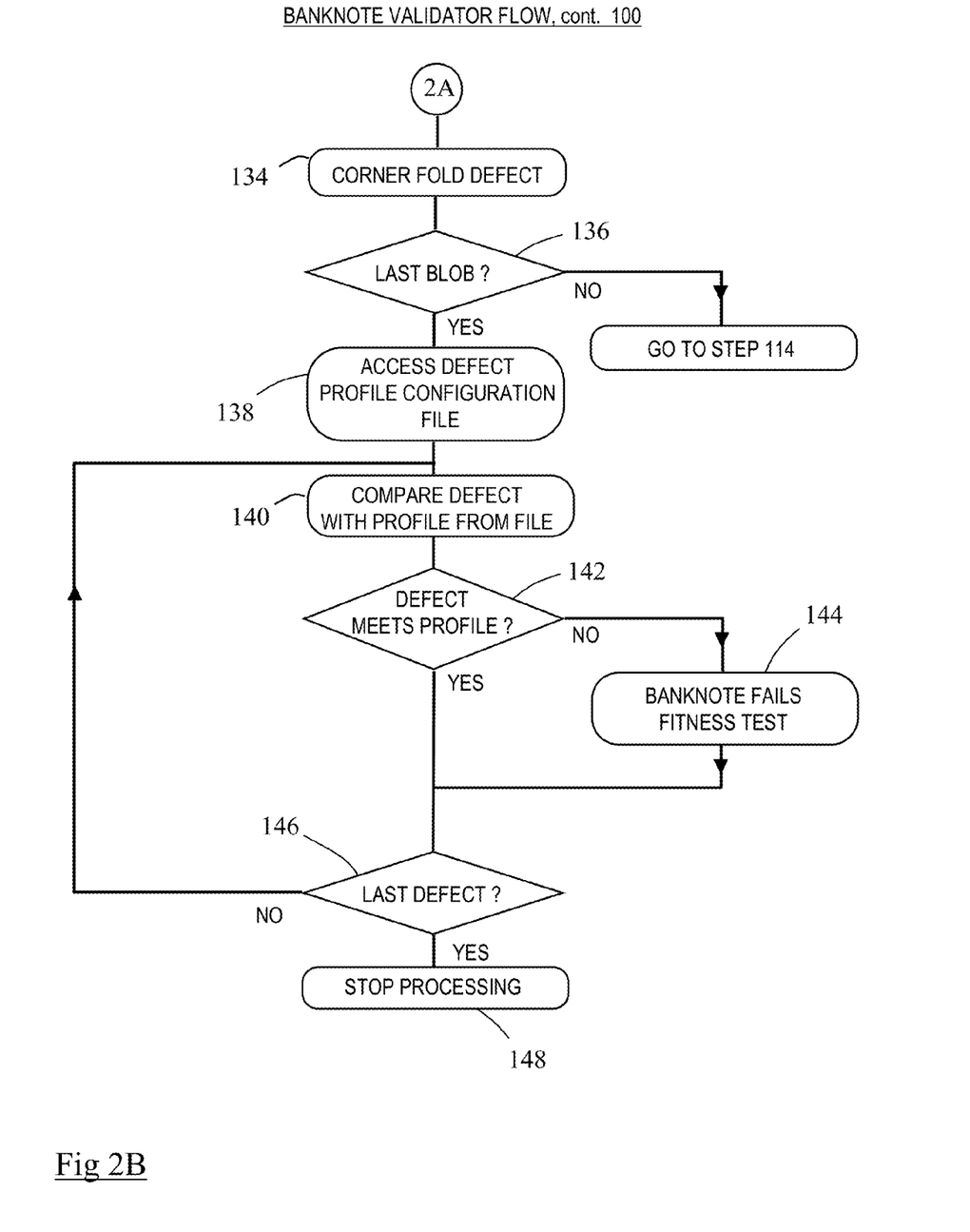

Reference is now also made to FIG. 2, which is a flowchart 100 illustrating steps performed by the banknote validator 12 (as controlled by the DSP 36) to categorise defects in a banknote.

Initially, a banknote 20 is inserted into the validator 12, which the banknote validator 12 receives (step 102).

The controller 34 then transports the banknote 20 to the examination area 22 (step 104) and causes the image collection component 30 to capture an image of the banknote 20 (IR transmitted) (step 106).

It should be appreciated that the image capture process may be used for multiple different purposes. For example, a captured IR image may be used for banknote recognition, stain detection, and other purposes. Furthermore, additional images (such as red and green channel images) may be captured at the same time for use in validating the banknote. In other words, the banknote validator 12 may include other light sources (for example, a green light source), not shown in FIG. 1 for clarity. However, these other features and purposes are not essential to an understanding of this invention, so they will not be described in detail herein. It is sufficient for the skilled person to realise that the same banknote validator may be used to perform multiple functions relating to media assessment.

Once an image of the banknote 20 has been captured, the image is normalised by the DSP 36 so that the captured image matches the size of a reference image for that type of banknote (step 108). This is to compensate for any media items that have added portions (such as adhesive tape) or have shrunk or expanded, or the like. Techniques for automatically aligning a captured image with a reference image, and then cropping or adding to the captured image to match the spatial dimensions of the reference image are well known in the art.

The DSP 36 stores the normalised image in the memory 38 as a raw image file 39 (which includes the full pixel intensity information) for subsequent processing (step 110), as described in more detail below.

The normalised image is then binarised (step 112) so that the binarised image comprises a plurality of pixels, each pixel having either a potential defect intensity or a non-defect intensity. In this embodiment transmission is used to create the initial image, so any area of high intensity indicates a potential defect intensity, and any area of low intensity indicates a non-defect intensity. As used herein, "potential defect" and "non-defect" relate to solely absence-based defects, such as tears, perforations, folds, missing portions, and the like. One feature of absence-based defects is that they cause an unusually high light transmission in an area that would normally have a much lower light transmission. A banknote may have a stained portion that transmits very little infra-red; this would be a defect in terms of banknote fitness, but not a "potential defect" in the context of absence-based defects (tears, perforations, folds, and the like).

Techniques to create a binarised image are well known. For example, a threshold may be applied to the captured pixel intensities, or to a contrast-stretched version of the captured pixel intensities.

The DSP 36 then detects all of the blobs in the binarised image (step 114) using a modified union-find structure algorithm. A "blob" (sometimes referred to as a binary large object) comprises contiguous pixels in an image that all have a similar property that is different to the corresponding property of the surrounding pixels. In this embodiment, a blob comprises contiguous potential defect (high intensity) pixels.

Figure 3A:
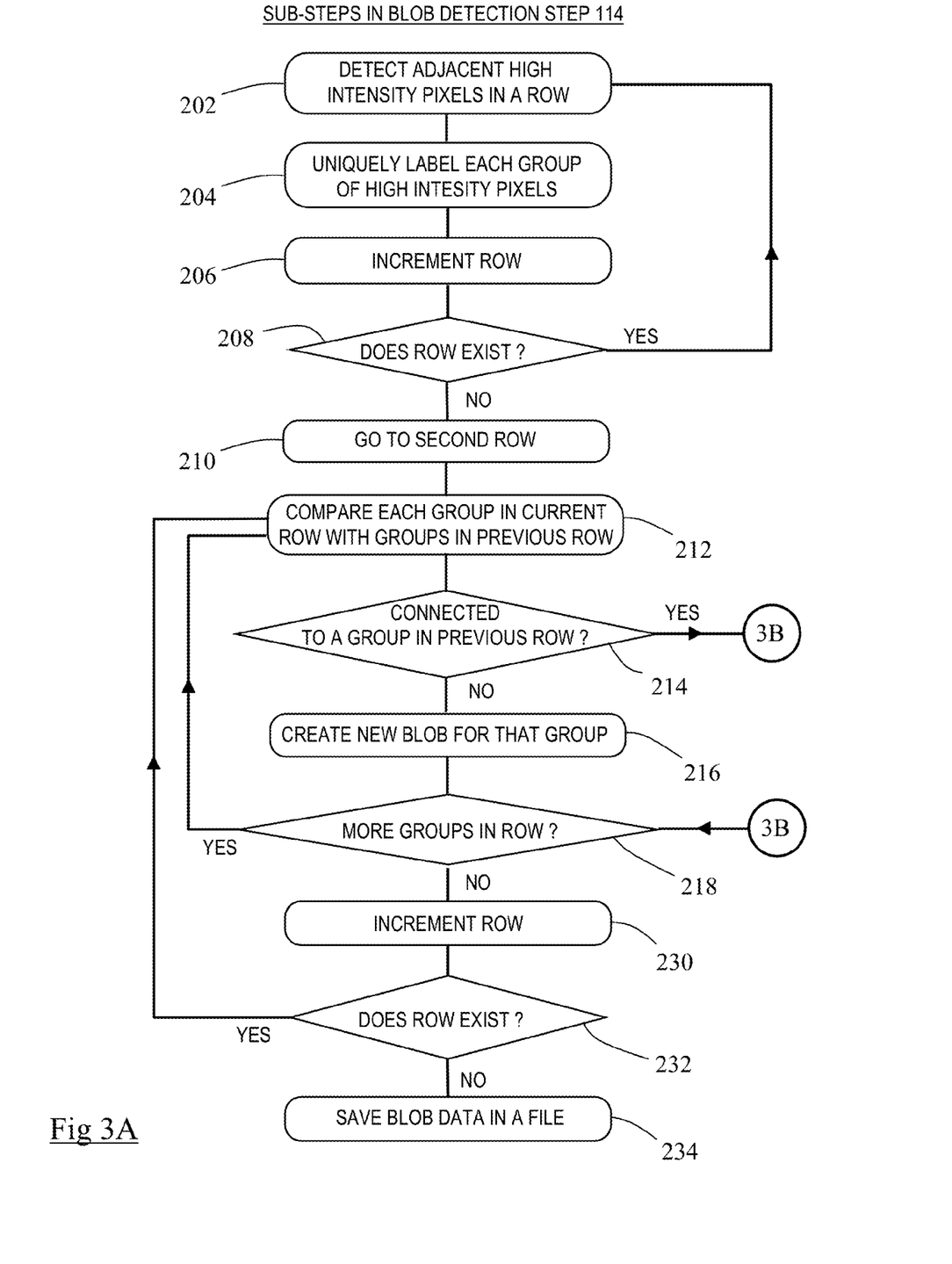
FIG. 3 (split over two sheets in the drawings) is a flowchart illustrating steps implemented by part of the media validator of FIG. 1 (a Digital Signal Processor) in detecting potential defects in the media item.
Figure 3B:
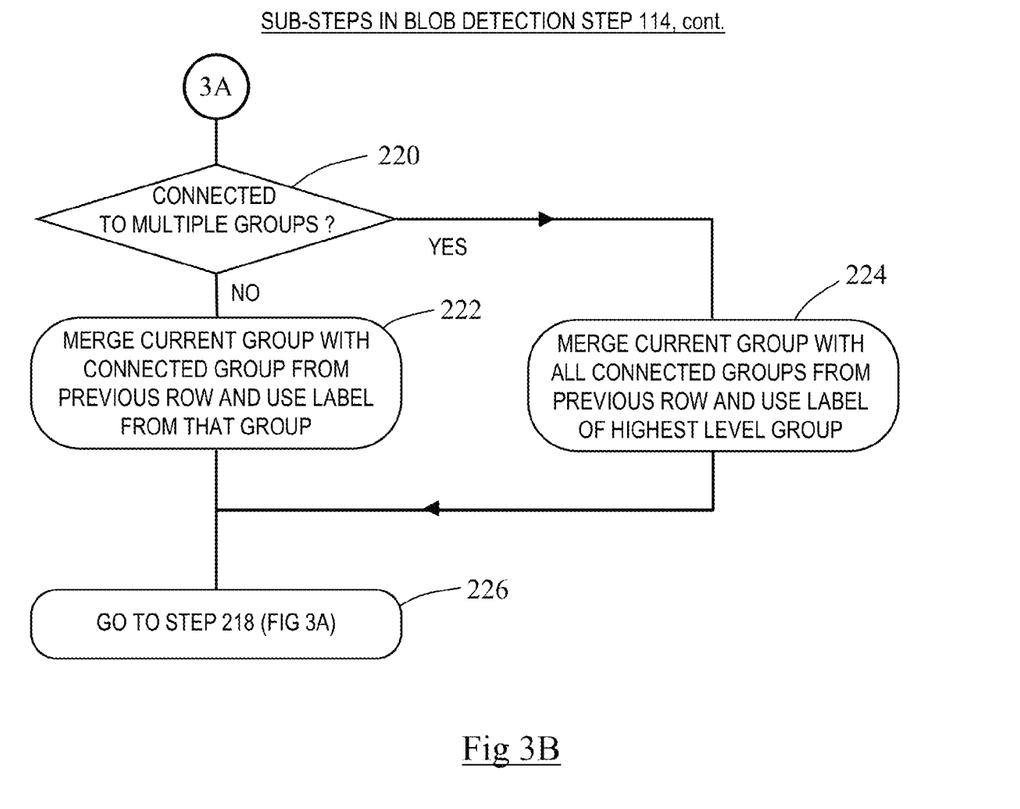

Reference will now be made to FIG. 3 (split over two drawing sheets as FIGS. 3A and 3B for clarity), which is a flowchart illustrating the steps implemented by the DSP 36 in performing the modified union-find structure algorithm. In other words, FIG. 3 illustrates the sub-steps of the blob detection step 114.

Initially, the DSP 36 detects all of the high intensity pixels (the potential defect pixels) in the first row of the image (step 202). The DSP 36 then uniquely labels each contiguous group of high intensity pixels (step 204).

The DSP 36 then increments the row (step 206). If this new row exists (step 208) (that is, if the current row is not the last row), then step 202 is repeated for this next row. This continues until all of the rows have been analysed, and all groups of high intensity pixels have been identified.

Once all of the rows have been analysed, the DSP 36 then starts at the second row (step 210), and compares each group in that row (initially, the second row) with the groups in the previous row (initially, the first row) (step 212).

For each group in the current row (initially, the second row), the DSP 36 ascertains if that group overlaps any group in the previous row (step 214).

If a group in the current row does not overlap any group in the previous row then that group is assigned a unique blob number (step 216). This is referred to as a growing blob because it may increase in size, depending on whether it overlaps any groups in the next row, as described in more detail below.

The DSP 36 ascertains if there are any more groups left in the current row (step 218). If there are more groups, then steps 212 and 214 are repeated for those groups. If there are no more groups in the current row, then processing will continue as described below.

Returning to step 214, if a group in the current row does overlap any group in the previous row then the DSP 36 ascertains if the group overlaps one other group or multiple other groups (step 220) (see FIG. 3B).

If a group in the current row overlaps only one group in the previous row, then the DSP 36 merges the current group with that other group and either assigns a unique blob number to the new merged group (if this is the second row) or uses the assigned unique blob number assigned to that other group (if this is any row after the second row) (step 222). The effect of this is to merge groups that overlap and retain only a single blob identification number for the merged group.

If a group in the current row overlaps multiple groups in the previous row, then the DSP 36 merges the current group with all of the groups that overlap the current group to create a single merged group (step 224). The DSP 36 uses the unique blob identification for the highest level group in the merged group. This means that the identification is taken from the group that appeared in the earliest (first, second, third, etc.) of the rows containing the groups.

Regardless of whether one or multiple groups overlap the current group, the next step is for the DSP 36 to return to step 218 (FIG. 3A) (step 226).

As mentioned above, step 218 is used to ensure that all of the groups in a row are processed before the DSP increments the row (step 230).

The DSP 36 ascertains if this new row exists (step 232). If this row exists, then steps 212 onwards are repeated for this new row.

If this new row does not exist (in other words, if the current row is the last row in the image), then blob detection is complete, and the position, identification, and dimensions (length, width, and area) of the detected blobs are all saved in the memory 38 by the DSP 36 in a blob identification file 40 (FIG. 1) (step 234).

In practical software implementations, the loop of steps 202 to 208 and the loop of steps 212 to 232 can be merged, and the abovementioned tasks of the adjacent high intensity pixel group detection and the subsequent group connectivity analysis and merge can be implemented in one scan of the image pixels.

Returning to FIG. 2, once all of the blobs have been detected at step 114, the next phase is to categorise the detected blobs.

This begins at step 116, at which each detected blob is compared with a blob area threshold (in this embodiment it is 8 mm$^2$).

If a detected blob is smaller than the blob area threshold, then the blob is ignored as insignificant (step 118) and the process moves to step 136 (described in more detail below).

If a detected blob is larger than (or equal in size to) the blob area threshold, then the DSP 36 ascertains if the detected blob is connected to an edge of the banknote 20 (step 120). In other words, is the blob an island in the central portion of the banknote, or does it touch an edge of the banknote?

If the detected blob is not connected to an edge of the banknote then it is categorised by the DSP 36 as a hole defect (step 122) and the process moves to step 136 (described in more detail below).

If the detected blob is connected to an edge of the banknote then the DSP 36 ascertains if the detected blob is at one of the four corners of the banknote 20 (step 124).

If the detected blob is not located at a corner of the banknote 20 then it is categorised by the DSP 36 as a tear/missing portion defect (step 126) and the process moves to step 136 (described in more detail below).

If the detected blob is located at a corner of the banknote 20 then the DSP 36 then performs calculations to ascertain if the corner is missing, or if it is folded back on itself (referred to as a corner fold) (step 128).

The calculations performed in this step (step 128) will now be described in more detail with reference to FIG. 4, which illustrates part of the banknote 20, with a corner edge folded back on itself.

Figure 4:
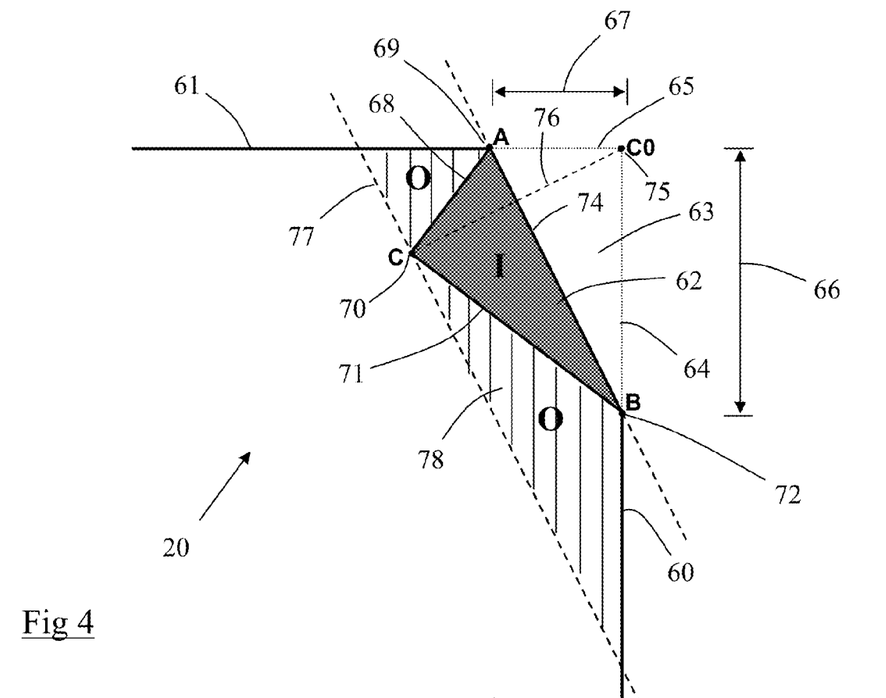
FIG. 4 is a pictorial drawing illustrating part of the media item, with a corner edge folded back on itself, together with boundary lines calculated by the DSP of FIG. 3.

In FIG. 4, the banknote 20 has a vertical (short) edge 60 and a horizontal (long) edge 61. Part of the corner (labelled "I") is folded back on the top side of the banknote 20 to create a corner fold region 62, as shown by the dark grey portion in FIG. 4, leaving a void area 63. The void area 63 is shown more clearly in FIG. 4 by the broken vertical line portion 64 and the broken horizontal line portion 65. When this banknote 20 is imaged and binarised, there will be a blob corresponding in size and shape to the void area 63. The length of the broken vertical line 64 is illustrated by arrow 66; and the length of the broken horizontal line 65 is illustrated by arrow 67.

As can be seen from FIG. 4, the corner fold region 62 has an upper angled edge 68 extending from an upper fold point 69 (labelled "A") at which the horizontal line portion 67 starts, to an original corner point 70 (labelled "C"). The length of the upper angled edge 68 equals the length of arrow 67.

The corner fold region 62 also has a lower angled edge 71 extending from the original corner point 70 (labelled "C") to a lower fold point 72 (labelled "B") at which the vertical line portion 64 starts. The length of the lower angled edge 71 equals the length of arrow 66.

The corner fold region 62 also has a fold edge 74 that extends from the upper fold point 69 (labelled "A") to the lower fold point 72 (labelled "B").

The banknote's original corner position 75 (that is, if the corner had not been folded back) is shown at the junction of the two line portions 64,65 and is labelled "C0".

A bisecting line 76 is shown extending from the original corner position 75 (labelled "C0") to the original corner point 70 (labelled "C") and passing through the fold edge 74 at right angles thereto.

An overlap limit line 77 is shown extending parallel to the fold edge 74 and passing through the original corner point 70 (labelled "C"). The non-overlap area 78 (labelled "O"), which is between the overlap limit line 77, the corner fold region 62, the vertical edge 60, and the horizontal edge 61, is shown with vertical lines.

The detected blob (equivalent to void area 63) that corresponds to this corner fold region 62 will directly provide the co-ordinates for the upper fold point 69 (labelled "A") and the lower fold point 72 (labelled "B") because the detected blob will correspond to the shape of the corner fold region 62. Since these points are connected by straight lines, these lines can be estimated using the following equation (equation 1):

$$y = mx + c \quad \text{equation 1}$$

In equation 1, m is the gradient of the line and c is point at which it passes through the y axis (the intersection point).

Using the co-ordinates for the upper fold point 69 (labelled "A") and the lower fold point 72 (labelled "B"), the DSP 36 can estimate the gradient (k) and intersection point (b) for the fold edge 74.

The DSP 36 accesses the normalised image stored in the raw image file 39 from (which was stored in the memory 38 in step 110).

The DSP 36 can extrapolate lines 60 and 61 from the normalised image to calculate the original corner position 75 (labelled "C0"). Once the original corner position 75 is known, it can be symmetrically projected about the fold edge 74 (since the equation for the fold edge is now known) to locate the original corner point 70 (labelled "C").

Once the original corner point 70 (labelled "C") is known, the DSP 36 uses the co-ordinates for the upper fold point 69 (labelled "A") and the original corner point 70 (labelled "C") to estimate the gradient (l) and intersection point (g) for the upper angled edge 68.

The DSP 36 also uses the co-ordinates for the original corner point 70 (labelled "C") and the lower fold point 72 (labelled "B") to estimate the gradient (r) and intersection point (h) for lower angled edge 71.

Once the DSP 36 has calculated the position of the original corner point 70 (labelled "C"), it can then calculate the equation for the overlap limit line 77. This is because the original corner point 70 (labelled "C") is on the overlap line 77, and the gradient of the overlap line (k) is the same as the gradient of the fold edge 74.

At this stage, the DSP 36 has calculated the potential corner fold location.

Returning to the flowchart of FIG. 2, the next step is for the DSP 36 to ascertain if there is a corner fold or a missing portion (step 130). To do this, the DSP 36 accesses the normalised image from the raw image file 39 (which includes the full pixel intensity information that was captured by the banknote validator 12) and uses the calculated points and lines to compare (i) the pixel intensities in the normalised image for the corner fold region 62, with (ii) the pixel intensities in the normalised image for the region defined by the non-overlap area 78.

If the pixel intensities in the corner fold region 62 are substantially lower than the pixel intensities in the non-overlap area 78 then this indicates that there is a corner fold because two layers of substrate are probably present at that region. However, if the pixel intensities in the corner fold region 62 are not substantially lower than the pixel intensities in the non-overlap area 78 then this indicates that there is a missing corner rather than a corner fold.

In this embodiment, the DSP 36 compares the lower quartile (that is, the lower 25%) of pixel intensities in the corner fold region 62 of the normalised image, with the lower quartile of pixel intensities in the non-overlap area 78 of the normalised image.

Figure 5:
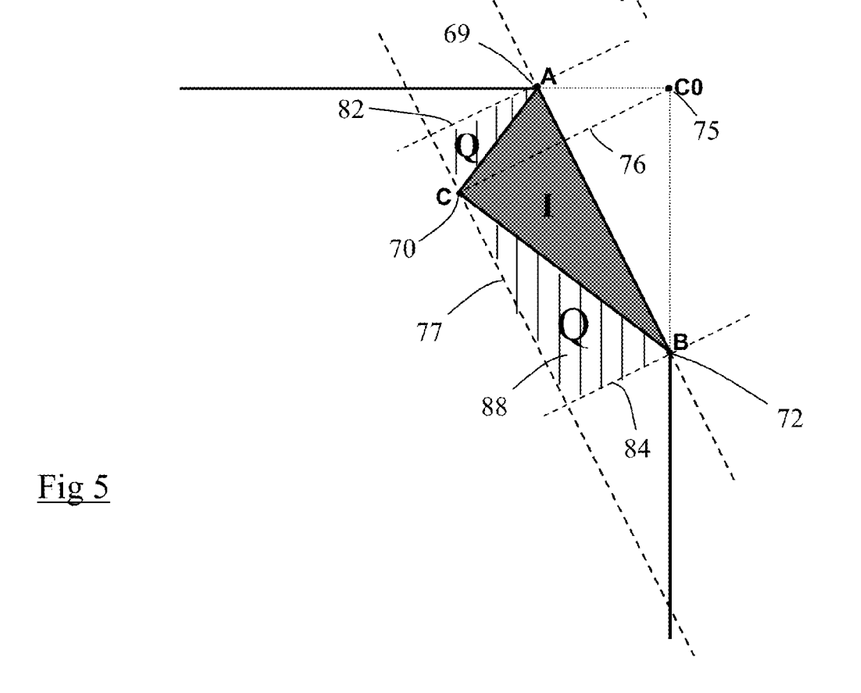
FIG. 5 is a pictorial drawing illustrating part of the media item, with a corner edge folded back on itself, together with optional additional boundary lines calculated by the DSP of FIG. 3.

In an alternative embodiment, the DSP 36 may calculate an extra two boundary lines, as illustrated in FIG. 5. An upper boundary line 82 is parallel to the bisecting line 76 (that is, it has the same gradient as the bisecting line 76) and passes through the upper fold point 69 ("A"). A lower boundary line 84 is also parallel to the bisecting line 76 and passes through the lower fold point 72 ("B"). The new non-overlap area 88 (labelled "Q") has the same area as the corner fold region 62.

In a similar way as for FIG. 4, the DSP 36 compares the lower quartile (that is, the lower 25%) of pixel intensities in the corner fold region 62 of the normalised image, with the lower quartile of pixel intensities in the non-overlap area 88 of the normalised image to ascertain if there is a corner fold (indicated by the pixel intensities in the corner fold region 62 being substantially lower in intensity than the pixel intensities in the non-overlap area 88) or a missing portion (indicated by the pixel intensities in the corner fold region 62 being similar in intensity to the pixel intensities in the non-overlap area 88).

If the pixel intensity ratio indicates that there is a missing portion then the DSP 36 categorises the defect as a missing portion defect (step 132) and the process moves to step 136 (described in more detail below).

If the pixel intensity ratio indicates that there is a corner fold then the DSP 36 categorises the defect as a corner fold defect (step 134).

The DSP 36 then ascertains if there are any more detected blobs that have not been categorised (step 136). If there are still uncategorised blobs, then the DSP 36 returns to step 114 as often as necessary until all of the detected blobs have been categorised.

Figure 6:
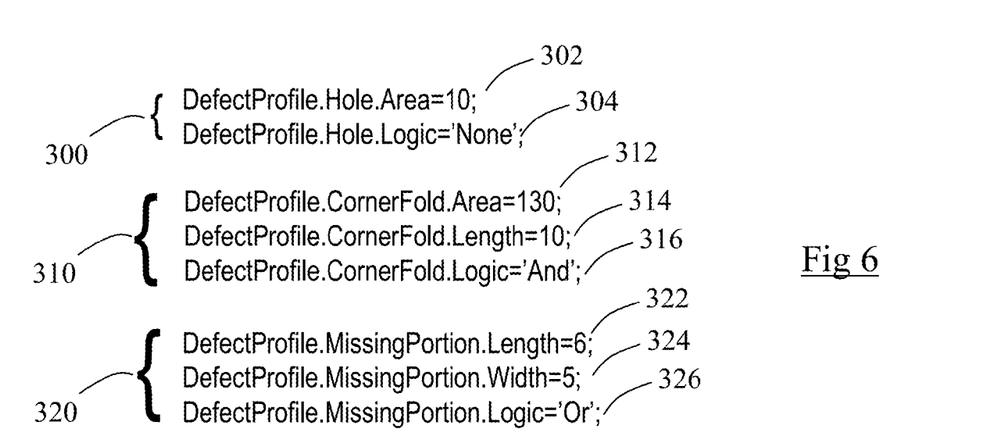
FIG. 6 illustrates an example of entries from a defect profile configuration file that is used to classify defects categorised by the system of FIG. 1.

If there are no more uncategorised blobs, then the DSP 36 accesses a defect profile configuration file 42 (FIG. 1) stored in the memory 38 (step 138). The defect profile configuration file 42 includes an entry for each defect type. FIG. 6 illustrates an example of entries from the defect profile configuration file 42. Each entry includes: a defect type parameter; a defect size field; and a logic parameter.

As shown in FIG. 6, there is an entry 300 for a hole defect type. Each line includes the defect type parameter ("hole") as part of the line. The first line 302 includes the defect size field (which comprises a single defect size parameter, namely an area equal to ten square millimeters); and the second line 304 includes the logic parameter (in this example, no logical connector is needed). This entry means that if a hole type of defect is detected that has an area greater than or equal to 10 mm$^2$, then the banknote having that defect should be characterised as unfit.

Entry 310 is for a corner fold defect. The defect size field comprises two defect size parameters. The first line 312 indicates an area of 130 mm$^2$ (which is the first defect size parameter); the second line 314 indicates a length of 10 mm (which is the second defect size parameter); and the third line 316 indicates that there is a logical AND connection between the two different size parameters. In other words, if a corner fold type of defect is detected that has an area greater than or equal to 130 mm$^2$ AND a length greater than or equal to 10 mm, then the banknote having that defect should be characterised as unfit (since neither size parameter is satisfied). If only one of these size parameters is not satisfied, then the banknote should be characterised as fit (unless other defects are present that would lead to a contrary result).

Entry 320 is for a missing portion defect. The first line 322 indicates a length of 6 mm, the second line 324 indicates a width of 5 mm; and the third line 326 indicates that there is a logical OR connection between the two different size parameters. In other words, if a missing portion type of defect is detected that has a length greater than or equal to 6 mm OR a width greater than or equal to 5 mm, then the banknote having that defect should be characterised as unfit. If neither of these size parameters is met, then the banknote should be characterised as fit (unless other defects are present that would lead to a contrary result).

Returning to the flowchart of FIG. 2, at step 140 the DSP 36 compares each categorised defect with the corresponding entry from the defect profile configuration file 42. This is to ascertain if that defect satisfies the defect profile (step 142).

The position, identification, and dimensions (length, width, and area) of the detected blobs were all saved in the blob identification file 40, which the DSP 36 accesses as part of this step.

If a categorised defect does not satisfy the defect profile (for example, because a hole type of defect has an area exceeding 10 mm$^2$), then the banknote 20 is characterised as unfit for continued circulation (step 144).

If the categorised defect does satisfy the defect profile, then the next step is for the DSP 36 to ascertain if there are any remaining categorised blobs that need to be compared with the defect profile configuration file 42 (step 146).

If there are still some remaining categorised blobs that need to be compared with the defect profile configuration file 42, then the DSP 36 returns to step 140 as often as necessary until all of the categorised blobs have been compared with the defect profile configuration file 42.

Once all of the categorised blobs have been assessed, then the banknote 20 is characterised as fit for continued circulation if all of the categorised blobs satisfy the defect profile configuration file 42. However, if even one categorised blob does not satisfy the defect profile configuration file 42, then the banknote 20 is characterised as unfit and should be removed from circulation. This may be implemented by segregating the banknote 20 in a different storage compartment within a media depository in which the banknote validator 12 is mounted.

The categorisation and banknote fitness characterisation then stops (step 148).

This embodiment has the advantage that it can be implemented rapidly while the banknote is being validated. The defect profile configuration file can be easily updated to accommodate changes in defect size parameters that are considered unacceptable. This embodiment only requires a single transmission channel, and can use relatively low resolution images (such as 25 dpi).

Various modifications may be made to the above described embodiment within the scope of the invention, for example, media items other than banknotes may have damage categorised using this technique.

In other embodiments, a different blob detection algorithm may be used than that described above.

In other embodiments, a different defect categorisation process may be used. For example, a tear/missing portion defect type may be further categorised as either a tear or missing portion by comparing the size of the blob with a threshold size for a missing portion. If the detected blob is smaller than the threshold size, then the detected blob is a tear; if equal to or larger than the threshold size, then the detected blob is a missing portion.

In other embodiments, different numerical methods may be used to estimate the location of points on a corner fold. For example, the original corner point 70 ("C") may be calculated using the lengths of the broken vertical line 64 and horizontal line 65 (66 and 67 respectively). The original corner point 70 being the intersection of an arc centred on upper fold point 69 ("A") having a radius equal to length 67 and an arc centred on lower fold point 72 ("B") having a radius equal to length 66.

In other embodiments, a different data structure may be used for the defect profile configuration file.

In other embodiments, the defect size parameters may be different to those described above.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of categorising defects in a media item, the method comprising the steps of:
   receiving a binarised image of the media item, where the binarised image comprises a two-dimensional array of pixels, each pixel having either a potential defect intensity or a non-defect intensity;
   identifying one or more blobs comprising contiguous pixels each having a potential defect intensity;
   for each identified blob, comparing a size of the blob with a damage threshold;
   ignoring the blob if the blob size is smaller than the damage threshold;
   for each identified blob having a size exceeding or equaling the damage threshold, categorising the identified blob as one or more of the following categories: tear, missing portion, corner fold, and hole, and wherein when a potential corner fold is present inspecting pixel intensities of a non overlap area against other pixel intensities associated with a potential corner fold region and when the other pixel intensities are not substantially lower than the pixel intensities categorising the blob as a missing corner; and
   comparing categorised blobs to corresponding unfit values in a defect profile configuration file to ascertain if the media item should be classified as unfit for any purpose.

2. A method according to claim 1, wherein the step of identifying one or more blobs comprises using a modified union-find structure algorithm.

3. A method according to claim 2, wherein the modified union-find structure algorithm comprises:
   identifying in each row of the binarised image, each group of pixels that are contiguous and that have a potential defect intensity;
   identifying for each row boundary,
   (i) each group in an upper row that at least partially overlaps with a group in the lower row, and merging overlapping groups in the upper and lower rows into new single groups as growing blobs,
   (ii) each group in the upper row that does not overlap any group in the lower row, and characterising each such group in the upper row as a complete blob, and
   (iii) each group in the lower row that does not overlap any group in the upper row, and characterising each such group in the lower row as a growing blob.

4. A method according to claim 1, wherein the step of categorising the identified blob comprises the further step of:
   (a) categorising the identified blob as a hole if the blob does not touch one of the edges of the media item.

5. A method according to claim 4, wherein the step of categorising the identified blob comprises the further step of:
   (b) if the identified blob does touch one of the edges of the media item but is not at one of the corners of the media item, then categorising the identified blob as a tear/missing portion.

6. A method according to claim 5, wherein the step of categorising the identified blob comprises the further step of:
   (c) if the identified blob does touch one of the corners of the media item then ascertaining if the identified blob is a corner fold.

7. A method according to claim 6, wherein the step of categorising the identified blob comprises the further step of:
   (d) if the identified blob does touch one of the corners of the media item but is not a corner fold, then categorising the identified blob as a missing portion.

8. A method according to claim 7, wherein the step of categorising the identified blob comprises the further step of:
   (e) if the identified blob does touch one of the corners of the media item and is a corner fold, then categorising the identified blob as a corner fold.

9. A media validator operable to categorise defects on a media item presented thereto, the media validator comprising:
   a media item transport for transporting a media item;
   an image capture device aligned with the media item transport and for capturing a two-dimensional array of pixels corresponding to the media item, each pixel having a pixel intensity relating to a property of the media item at a spatial location on the media item corresponding to that pixel; and
   a processor programmed to control the media transport and the image capture device, and also programmed to:
   (a) identify one or more blobs comprising contiguous pixels each having a potential defect intensity;
   (b) for each identified blob, compare a size of the blob with a damage threshold;
   (c) ignore the blob if the blob size is smaller than the damage threshold;
   (d) for each identified blob having a size not smaller than the damage threshold, categorise the identified blob as one or more of the following categories: tear, missing portion, corner fold, and hole, and wherein when a potential corner fold is present inspecting pixel intensities of a non overlap area against other pixel intensities associated with a potential corner fold region and when the other pixel intensities are not substantially lower than the pixel intensities categorising the blob as a missing corner; and
   (e) compare categorised blobs to corresponding unfit values in a defect profile configuration file to ascertain if the media item should be classified as unfit for any purpose.

10. A method of characterising a media item as unfit, the method comprising:
    implementing the method of claim 1 to categorise defects in the media item;
    wherein the comparing step includes
    for each categorised defect, accessing the defect profile configuration file to retrieve (i) a defect type matching the categorised defect, and (ii) a defect size associated with that defect type; and
    characterising the media item as unfit if a categorised defect includes a dimension meeting the requirements of the defect size for that defect type.

11. A media validator comprising a controller programmed to implement the method of claim 10.

12. A media validator according to claim 11, wherein the media validator implements additional media item processing functions on banknotes.

* * * * *